United States Patent
Kussmaul

(10) Patent No.: US 8,745,642 B2
(45) Date of Patent: Jun. 3, 2014

(54) METHOD AND SYSTEM FOR SHARING DATA BETWEEN PORTLETS WITHIN A PORTAL

(75) Inventor: Timo Kussmaul, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1548 days.

(21) Appl. No.: 11/847,601

(22) Filed: Aug. 30, 2007

(65) Prior Publication Data

US 2008/0104611 A1    May 1, 2008

(30) Foreign Application Priority Data

Oct. 27, 2006    (EP) .................................... 06123051

(51) Int. Cl.
*G06F 3/00*    (2006.01)

(52) U.S. Cl.
USPC .......................................... 719/329; 715/748

(58) Field of Classification Search
None
See application file for complete search history.

(56) References Cited

U.S. PATENT DOCUMENTS

2004/0243577 A1* 12/2004 Choudhary et al. .............. 707/6
2005/0175015 A1*  8/2005 Ramaswamy et al. ... 370/395.52

OTHER PUBLICATIONS

Opera's Settings File Explained; http://replay.waybackmachine.org/20060815014026/http://www.opera.com/support/usingopera/operaini/; retrieved Mar. 21, 2011; archived Aug. 15, 2006; 31 pages.*

* cited by examiner

*Primary Examiner* — Andy Ho
*Assistant Examiner* — Kimberly Jordan
(74) *Attorney, Agent, or Firm* — Jeff Tang; Hoffman Warnick LLC

(57) ABSTRACT

The present invention relates to a method and respective system for sharing data between portlets within a portal. In general, a method in accordance with an embodiment of the invention includes: generating a visual representation, indicating for a predetermined first portlet a portlet property indicating whether or not the first portlet shares data with a second portlet; displaying the visual representation at the web page rendering the first portlet; and/or generating a user control, allowing to switch ON and switch OFF the ability of the first portlet to share data with the second portlet, and performing portlet integration in dependence of the portlet property.

12 Claims, 4 Drawing Sheets

METHOD AND SYSTEM FOR SHARING DATA BETWEEN PORTLETS WITHIN A PORTAL

BACKGROUND OF THE INVENTION

1. Field of the Invention

The present invention relates to the field of network computing, and in particular to web content accessible via a portal and a method and respective system for sharing data between portlets within a portal.

2. Related Art

Portals provide end users with unified access to content, applications, and collaboration services in a highly personalized manner. An example is IBM's WebSphere Portal which provides a middleware framework and tools for building and managing portals using component applications called "portlets".

FIG. 1 gives a schematic system view of a web server implementing a prior art portal.

A portal is typically implemented on a network server, for example a web server 100, which includes various logic components for user authentication 105, state handling 110, and aggregation 115 of fragments. The web server 100 further includes a plurality of portlets 120 provided in respective pages 125, with a respective plurality of APIs 130 to a respective portlet container software 135 for setting the pages 125 into a common web page context, and some portal storage resources 140. The logic components are operatively connected such that data can be exchanged between single components as required.

A portal engine of the web server 100 in FIG. 1 implements an aggregation of portlets 120 based on an underlying portal model 150 and portal information such as security settings, user roles, customization settings, and device capabilities. Within a rendered page 125, the portal automatically generates the appropriate set of navigation elements based on the portal model 150. The portal engine invokes portlets 120 during the aggregation as required and when required and uses caching to reduce the number of requests made to the portlets 120.

Web clients interact with portlets via a request/response paradigm implemented by the portal. Usually, users interact with content produced by portlets by, for example, following links or submitting forms, resulting in portlet actions being received by the portal, which are then forwarded to the portlets targeted by the user's interactions.

Prior art portals provide integration functionality which facilitates cooperative portlets that can be developed independently but can interact with one another and share the same information. Cooperative portlets exchange information, react in a coordinated manner and provide menus to share information by selecting an action.

For example, a property (one piece of information, for example, a department number) can be "published" by a department list viewer portlet and "consumed" by a target portlet displaying all employees from the selected department number or can be consumed by a portlet displaying detailed information of the selected department. In addition, the cooperative portlet technology also enables the broadcast of data to multiple portlets.

A prior art integration component as disclosed in US 2004/0243577 is, for example, implemented in an integration component 116 (FIG. 1). The integration component relies on portlets being producers and consumers of typed properties. Portlets can either register directly as consumers and producers of properties or indirectly via specific actions that consume and produce properties. The integration component facilitates interactions between portlets either by allowing the property produced by a portlet to be consumed by another portlet or by allowing a property produced by a portlet to trigger an action on another portlet. The integration component uses the types associated with properties to determine compatibility between properties belonging to different portlets.

The integration component may not by itself orchestrate the interactions between portlets. Instead, it allows portal users to manually direct interactions by presenting them with a pop-up menu to trigger any of the valid interactions. It also allows portal administrators to specify the automatic triggering of interactions with page definitions.

The integration component also allows a portal administrator to configure connections, or wires, between cooperative portlets. Properties are then exchanged automatically between connected portlets. Setting up wires between portlets allows to persistently save data transfer selection choices. The wire may be used to automatically transfer properties to target portlets when specific interactions are performed without displaying the pop-up menu prompting the user for more information.

Disadvantageously, this method is very inflexible for a portal user because the above mentioned wires between portlets typically are fixed for a user and can be configured by a portal administrator only. Thus, when an administrator has configured a wire between two portlets A and B on a portlet page, a user action in portlet A will trigger an action in portlet B, which in turn changes the internal persistent state of portlet B. Given a situation where the user wants to use portlet A but does not want to change the internal state of portlet B, and where the wiring between portlet A and portlet B is fixed and can be changed by an administrator only, the user cannot realize his intentions.

SUMMARY OF THE INVENTION

The present invention provides a method and respective system for sharing data between portlets within a portal.

According to an aspect of the invention, there is provided a method for sharing data between portlets within a portal infrastructure comprising at least one portal and a plurality of portlets deployed to a portal, wherein the portal comprises a portal integration component which provides data sharing functionality, comprising: registering portlet registration data comprising a set of consumed properties, wherein each property is associated with a portlet action, and wherein the integration component stores the registration data; storing for each portlet an integration mode parameter indicating if the portlet shares data with a second portlet; during processing of a first action request; the portal invoking a first portlet targeted by the first request; the first portlet invoking the integration component to publish a property, wherein the property comprises a value and a data type; the integration component storing the published property; the portal invoking the integration component; the integration component checking the integration mode parameter associated with the first portlet; if the parameter indicates that the first portlet shares data, the integration component retrieving the properties published by the portlet; the integration component determining a second set of portlets registered to consume a property published by the first portlet; for each portlet of the second set of portlets, determining if a respective second set portlet shares data; if sharing data, the integration component issuing an action request to the respective second set portlet, including the registered action and the property value into the action request; and during processing of a second render request; the portal generating a visual representation, indicating for the first portlet the integration mode parameter telling whether or not the first portlet shares data with a second portlet; and displaying the visual representation at the web page rendering the first portlet.

The visual representation may be a graphical item, preferably displayed within the portlet representation, or may be a text component, displayed, for example, in the title bar of the portlet window. Due to this feature, a user may easily recognize if this portlet is enabled to share data or not. Thus, the user obtains a warning and can explore data dependencies, reducing the risk to provoke error cases during runtime usage of the web page wherein in one portlet data is changed, and in another portlet a change in the internal state is not intended. Further, the title bar may indicate the title of the window associated with the portlet sharing the data. The visual representation may also comprise a link to the second (or multiples of) portlet(s) sharing the data.

In an embodiment, the term "sharing data" is meant to be understood to indicate business data, which is processed by the portlets, i.e., generally such data where an undetected data dependency would implicate some further difficulties. Other types of sharing data are also possible.

When further generating a user control, allowing to switch ON and switch OFF the ability of the first portlet to share data with the second portlet, the foregoing feature is extended to be actively used for controlling the data dependencies in a very simple manner.

A portlet mode indicates the function a portlet is performing. Normally, portlets can perform different tasks and create different content depending on the function they are currently performing. A portlet mode advises the portlet what task it should perform and what content it should generate. The prior art portlet specification (JSR 168) defines the following three portlet modes: VIEW, EDIT, and HELP. When an additional portlet mode, referred to herein as PORTLET INTEGRATION MODE implements the portlet property of sharing data, this feature or the foregoing one can be easily implemented in prior art portal generation and administration products without being constraint to involve new interfaces.

Multiple portlets can be switchable by the user control. This can be advisable, for example, for larger portals having many portlets and a complex data dependency structure.

An illustrative useful implementation is when a) the first portlet indicates whether or not it supports an integration mode, and when b) a portlet aggregation component generates a user control, allowing to switch ON and switch OFF the ability of a first portlet to share data with a second portlet.

Thus, the present invention enables integration functionality for portlets that are in integration mode and disables integration functionality for portlets that are not in integration mode.

According to the invention an integration mode for portlets is provided, by which a user or an application can dynamically control the integration functionality for a specific portlet. A visual representation of the integration mode in the portal page can be created, thus providing feedback for the user.

Further, visual symbols can be provided on the portal page to switch ON and OFF the integration mode for one or multiple portlets.

Thus, in general, the method of the present invention comprises:

a) generating a visual representation, indicating for a predetermined first portlet a portlet property indicating whether or not the first portlet shares data with a second portlet;

b) displaying the visual representation at the web page rendering the first portlet; and/or c) generating a user control, allowing to switch ON and switch OFF the ability of the first portlet to share data with the second portlet, and d) performing portlet integration in dependence of the portlet property.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION OF THE INVENTION

Figure 1:
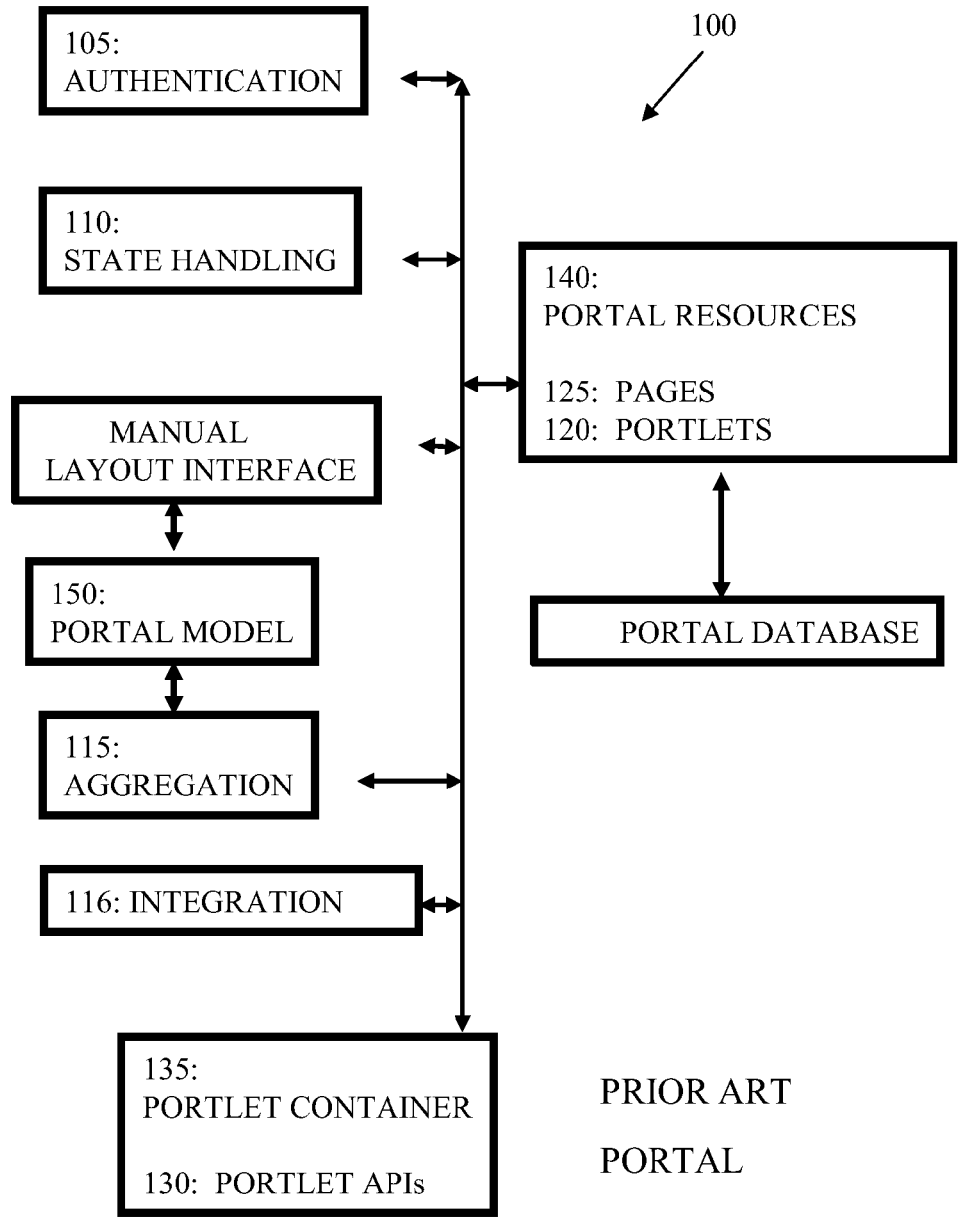
FIG. 1 illustrates a schematic system view of a web server implementing a prior art portal.
Figure 2:
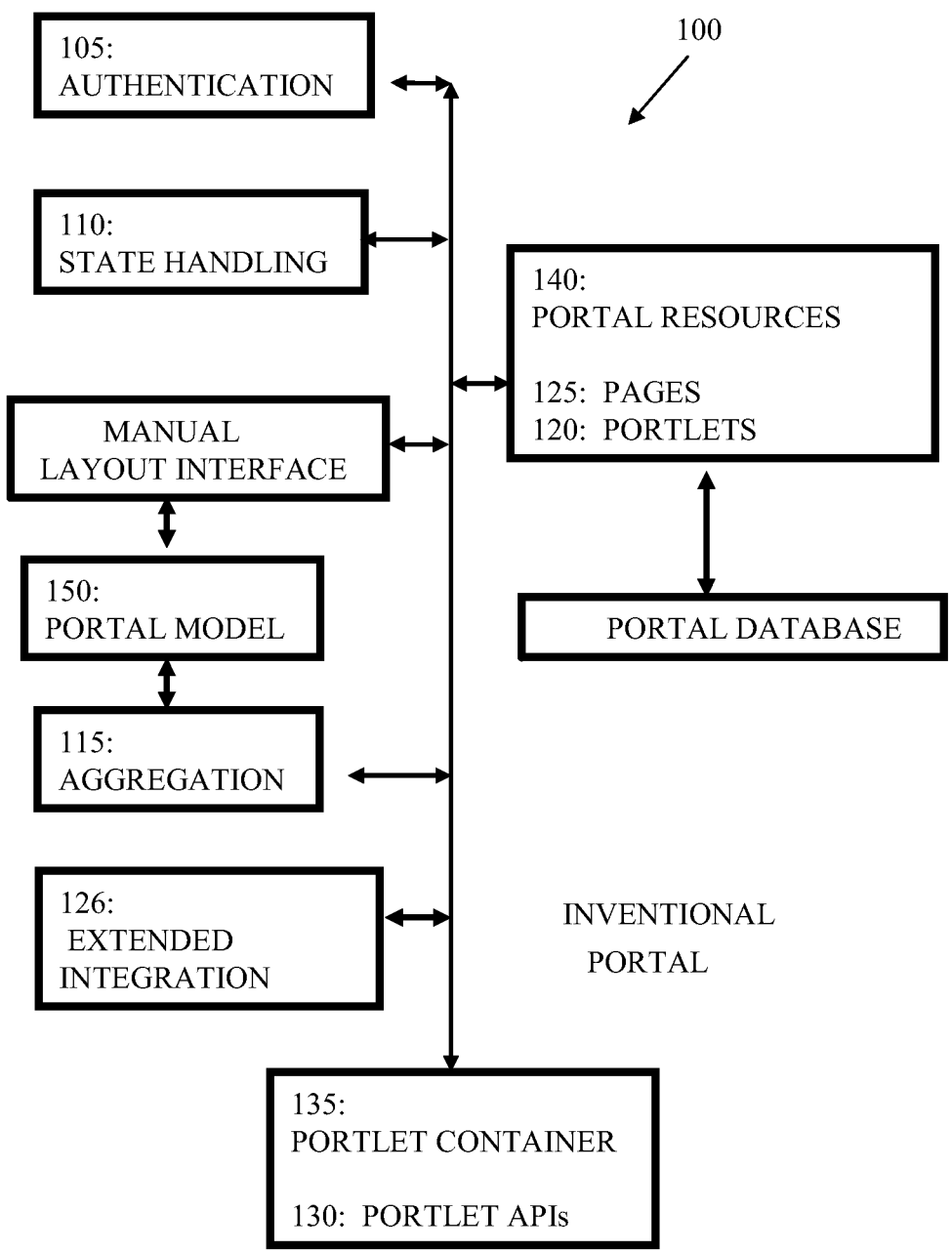
FIG. 2 illustrates a schematic system view of a web server implementing a portal in accordance with an embodiment of the present invention.

FIG. 2 illustrates a schematic system view of the web server 100 that is extended by an extended integration component 126 in accordance with an embodiment of the present invention.

The extended integration component 126 provides a registration mechanism to be used by a portlet 120. A portlet 120 invokes this registration mechanism and passes a set of properties that are consumed by the portlet 120. A property is an arbitrary item of data and is described by a data type, the data type being identified by a data type identifier. In one embodiment of the extended integration component 126, a data type can be defined in an XML format, and the data type identifier comprises the XML namespace. In another embodiment, the data type identifier is an arbitrary text string.

The extended integration component 126 accepts the registration request from a portlet 120 and stores the set of consumed properties in its internal data structures. A consumed property may be registered to be associated with a portlet action. Again, the extended integration component 126 stores this association in its internal data structures by creating a data object for each property registered by the portlet 120 and saving the properties data type, the portlet identification and the action. Thus, the internal data structure of the extended integration component 126 is updated, containing a set of data items, wherein each data item specifies one property, one portlet and one action.

The extended integration component 126 may comprise a set of dedicated application programming interfaces; it may also comprise an mechanism for declaratively specifying consumed properties. Thus a portlet 120 may contain code for invoking these APIs in order to register properties or it may provide a document containing declarations of consumed properties. Again, these declarations comprise a set of properties containing the data type identifier of the property and the specification of the portlet action that is associated with this property.

Figure 3:
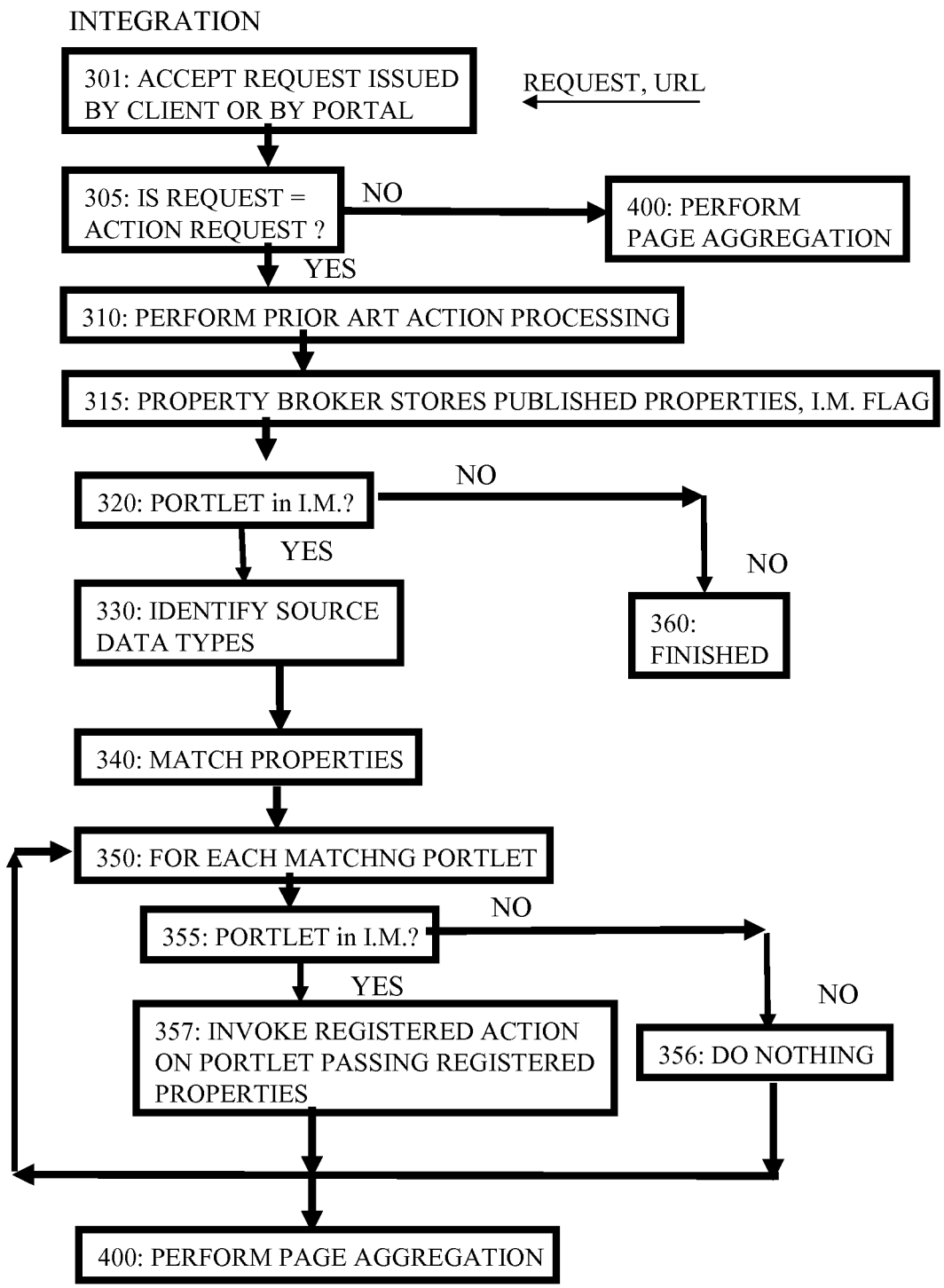
FIG. 3 illustrates a control flow of a method performed by an integration component in accordance with an embodiment of the present invention.

Next, and with reference to FIG. 3, the control flow will be described in more detail.

In 301, the portal accepts a request issued either by a client or by the portal itself. The latter may be the case during processing of cascading requests. The request comprises a URL that contains encoded state information. A state handling component decodes and processes this state information and merges it into state information managed at the portal server, thus determining in a check step 305 the portal state associated with the request. The state handling component provides this portal state to the other portal components.

In 310, the portal performs action processing, which includes invoking a portlet through a portlet container and passing request associated data to the portlet. The portlet performs proprietary logic in order to process the request and to update its internal state and to return a response to the portlet container. During action processing the portlet may publish one or multiple properties to the extended integration component 126. This is accomplished by invoking respective integration component APIs. The published properties contain a property data type identifier and a property value. In 315, the extended integration component 126 accepts these API requests and stores the published properties in its internal data structure by a respective "property broker" component. Further, the state handling component stores a flag for each portlet, indicating if the portlet shares data with a second portlet.

The portal checks in 320 if the invoked portlet is in integration mode (I.M.). The information indicates if/if not this first portlet is in integration mode, is available from the state handling component, which either takes this information from the request, e.g., the request URL, if the request contains respective information, or takes it from its internal data structures which contain further portal state information.

If the first portlet is not in integration mode, the extended integration component 126 does not perform any integration functionality and thus finishes the control flow in step 360.

Performing this check in the portal outside of the portlet has the advantage that the advanced portlet integration functionality of the present invention is transparent to the portlet. Thus, this means that the code of a prior art portlet does not need to be changed to support the portlet integration mode of the present invention.

If the first portlet is in integration mode, (YES branch of 320), the extended integration component 126 retrieves the property that is published by this first portlet from its internal data structures. In 330, the extended integration component 126 determines the "source" data type of the property published by the first portlet.

In 340, the extended integration component 126 matches properties, i.e., determines the portlets that have registered consumed properties that match the data type of the property published by the first portlet. Matching is performed by comparing the data type identifiers of the published property and the consumed property. The extended integration component 126 determines the set of matching consuming portlets by iterating over its internal data structures. This results in a second set of matching portlets, i.e., a set of portlets that registered interest in one of the properties published by the first portlet.

In 350, the extended integration component 126 iterates over this second set of matching portlets, performing 355, 356, and 357 for every portlet of the second set of portlets. In particular, in 355, the extended integration component 126 checks if the portlet of the second set of portlets is in integration mode. If it is not in integration mode, no further processing is performed for this portlet (356), and the processing continues with the next matching portlet.

If the portlet is in integration mode (YES branch of 355), the extended integration component 126 determines in 357 the action the portlet has registered for the matching property. The extended integration component 126 requests the portlet container to invoke the portlet for action processing, passing the action and the matching property. The portlet performs prior art action processing by executing respective proprietary logic. After the portlet has finished the request processing, the extended integration component 126 continues the loop by branching back to the loop control 350.

After all matching properties have been processed, the extended integration component 126 returns control to the portal, which in 400 starts page aggregation.

Figure 4:
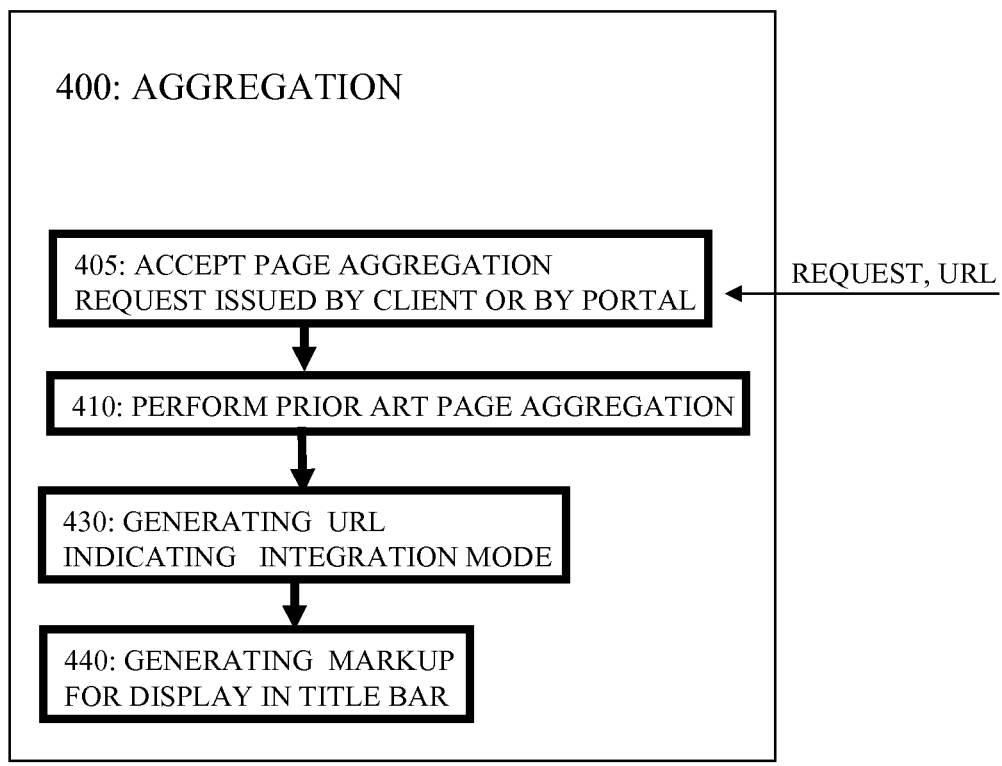
FIG. 4 illustrates a control flow of a method performed by an aggregation component in accordance with an embodiment of the present invention.

Next, and with reference to FIG. 4, the page aggregation control flow will be described in more detail.

The aggregation component 115 operates as follows. First, in 405, it receives a request for page aggregation. In 410, it performs page aggregation. This includes determining the set of portlets contained on the page, invoking the portlets through the portlet container, and aggregating the mark-up fragments contained in the individual portlet responses into a web page.

Next, in 430, a visual representation is created to switch a specific portlet to integration mode. This is implemented as follows. The aggregation component 115 generates an URL in 430 and includes state information that indicates that this portlet is switched to integration mode. Then the aggregation component 115 creates mark-up for a text or graphical (icon) link associated with the above URL and includes in 440 this mark-up in the page content, for example, in the portlet title bar.

Some/all aspects of the present invention can be provided on a computer-readable medium that includes computer program code for carrying out and/or implementing the various process steps of the present invention, when loaded and executed in a computer system. It is understood that the term "computer-readable medium" comprises one or more of any type of physical embodiment of the computer program code. For example, the computer-readable medium can comprise computer program code embodied on one or more portable storage articles of manufacture (e.g., a compact disc, a magnetic disk, a tape, etc.), on one or more data storage portions of a computer system, such as memory and/or a storage system (e.g., a fixed disk, a read-only memory, a random access memory, a cache memory, etc.), and/or as a data signal travelling over a network (e.g., during a wired/wireless electronic distribution of the computer program code).

As used herein, the term "computer program code" refers to any expression, in any language, code or notation, of a set of instructions intended to cause a computer system having an information processing capability to perform a particular function either directly or after either or both of the following: (a) conversion to another language, code or notation; and (b) reproduction in a different material form. The computer program code can be embodied as one or more types of computer program products, such as an application/software program, component software/library of functions, an operating system, a basic I/O system/driver for a particular computing and/or I/O device, and the like.

It should be appreciated that the teachings of the present invention could be offered as a business method on a subscription or fee basis. For example, a service provider (e.g., a provider of cell phone service) can create, maintain, enable, and deploy a text-to-speech assist for portable communication devices, as described above.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A method for sharing data between portlets within a portal infrastructure comprising at least one portal and a plurality of portlets deployed to the at least one portal, wherein the portal comprises a portal integration component which provides data sharing functionality, comprising:
   registering, using a computer device, portlet registration data for each portlet comprising a set of consumed properties, wherein each consumed property is associated with a portlet action, and wherein the integration component stores the portlet registration data;
   storing, using the computer device, for each portlet an integration mode parameter indicating if the portlet shares data with a second portlet;
   during processing of a first action request, using the computer device;
      the portal invoking a first portlet targeted by the first action request;
      the first portlet invoking the portal integration component to publish a property, wherein the property comprises a value and a data type identifier;
      the portal integration component storing the published property;
      the portal invoking the portal integration component including the stored published property of the first portlet;
      the portal integration component retrieving the property published by the first portlet in response to the integration mode parameter indicating that the first portlet shares data;
      the portal integration component determining a second set of portlets registered to consume the published property by the first portlet, wherein the determining comprises matching the data type identifier of at least one consumed property with the published property;
      issuing, using the portal integration component, a second action request to each portlet of the second set of portlets determined to be sharing data in response to determining at least one portlet of the second set of portlets shares data, including the registered portlet registration data and the value into the second action request; and
   during processing of a render request;
      the portal generating a visual representation, indicating for the first portlet the integration mode parameter telling whether or not the first portlet shares data with the second portlet; and
      displaying the visual representation at a web page rendering the first portlet and indicating in a first portlet title bar whether the first portlet shares data with the second portlet.

2. The method according to claim 1, further comprising:
   generating a user control, allowing to switch ON and switch OFF an ability of the first portlet to share data with the second portlet.

3. The method according to claim 1, wherein an additional portlet mode implements the integration mode parameter of sharing data.

4. The method according to claim 3, wherein the first portlet indicates whether or not it supports an integration mode, and wherein a portlet aggregation component generates a user control, allowing to switch ON and switch OFF the ability of the first portlet to share data with the second portlet.

5. A system for sharing data between portlets within a portal infrastructure comprising at least one portal and a plurality of portlets deployed to the at least one portal, wherein the portal comprises a portal integration component which provides data sharing functionality, the system comprising:
   at least one computer device including at least one component configured for:
   registering, using a computer device, portlet registration data for each portlet comprising a set of consumed properties, wherein each consumed property is associated with a portlet action, and wherein the integration component stores the portlet registration data;
   storing, using the computer device, for each portlet an integration mode parameter indicating if the portlet shares data with a second portlet;
   during processing of a first action request, using the computer device;
      the portal invoking a first portlet targeted by the first action request;
      the first portlet invoking the portal integration component to publish a property, wherein the property comprises a value and a data type identifier;
      the portal integration component storing the published property;
      the portal invoking the portal integration component including the stored published property of the first portlet;
      the portal integration component retrieving the property published by the first portlet in response to the integration mode parameter indicating that the first portlet shares data;
      the portal integration component determining a second set of portlets registered to consume the published property by the first portlet, wherein the determining comprises matching the data type identifier of at least one consumed property with the published property;
      issuing, using the portal integration component, a second action request to each portlet of the second set of portlets determined to be sharing data in response to determining at least one portlet of the second set of portlets shares data, including the registered portlet registration data and the value into the second action request; and
   during processing of a render request;
      the portal generating a visual representation, indicating for the first portlet the integration mode parameter telling whether or not the first portlet shares data with the second portlet; and
      displaying the visual representation at a web page rendering the first portlet and indicating in a first portlet title bar whether the first portlet shares data with the second portlet.

6. The system according to claim 5, further comprising at least one component for:
   generating a user control, allowing to switch ON and switch OFF an ability of the first portlet to share data with the second portlet.

7. The a system according to claim 5, wherein an additional portlet mode implements the integration mode parameter of sharing data.

8. The system according to claim 7, wherein the first portlet indicates whether or not it supports an integration mode, and wherein a portlet aggregation component generates a user control, allowing to switch ON and switch OFF the ability of the first portlet to share data with the second portlet.

9. A program product stored on a non-transitory computer readable medium, which when executed, shares data between portlets within a portal infrastructure comprising at least one portal and a plurality of portlets deployed to the at least one portal, wherein the portal comprises a portal integration component which provides data sharing functionality, the computer readable medium comprising program code for:

registering, using a computer device, portlet registration data for each portlet comprising a set of consumed properties, wherein each consumed property is associated with a portlet action, and wherein the integration component stores the portlet registration data;

storing, using the computer device, for each portlet an integration mode parameter indicating if the portlet shares data with a second portlet;

during processing of a first action request, using the computer device;

the portal invoking a first portlet targeted by the first action request;

the first portlet invoking the portal integration component to publish a property, wherein the property comprises a value and a data type identifier;

the portal integration component storing the published property;

the portal invoking the portal integration component including the stored published property of the first portlet;

the portal integration component retrieving the property published by the first portlet in response to the integration mode parameter indicating that the first portlet shares data;

the portal integration component determining a second set of portlets registered to consume the published property by the first portlet, wherein the determining comprises matching the data type identifier of at least one consumed property with the published property;

issuing, using the portal integration component, a second action request to each portlet of the second set of portlets determined to be sharing data in response to determining at least one portlet of the second set of portlets shares data, including the registered portlet registration data and the value into the second action request; and during processing of a render request;

the portal generating a visual representation, indicating for the first portlet the integration mode parameter telling whether or not the first portlet shares data with the second portlet; and displaying the visual representation at a web page rendering the first portlet and indicating in a first portlet title bar whether the first portlet shares data with the second portlet.

10. The program product according to claim 9, further comprising program code for:

generating a user control, allowing to switch ON and switch OFF an ability of the first portlet to share data with the second portlet.

11. The program product according to claim 9, wherein an additional portlet mode implements the integration mode parameter of sharing data.

12. The program product according to claim 11, wherein the first portlet indicates whether or not it supports an integration mode, and wherein a portlet aggregation component generates a user control, allowing to switch ON and switch OFF the ability of the first portlet to share data with the second portlet.

* * * * *